(12) United States Patent
Braun et al.

(10) Patent No.: US 12,374,789 B2
(45) Date of Patent: Jul. 29, 2025

(54) ACTIVE ANTENNA SYSTEM COMPRISING COUPLING PATHS BETWEEN FEED NETWORKS

(71) Applicant: Telefonaktiebolaget LM Ericsson (publ), Stockholm (SE)

(72) Inventors: Christian Braun, Vallentuna (SE); Stefan Johansson, Romelanda (SE); Haitao Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 218 days.

(21) Appl. No.: 18/280,291

(22) PCT Filed: Nov. 16, 2021

(86) PCT No.: PCT/SE2021/051143
§ 371 (c)(1),
(2) Date: Sep. 5, 2023

(87) PCT Pub. No.: WO2022/191750
PCT Pub. Date: Sep. 15, 2022

(65) Prior Publication Data
US 2024/0072434 A1   Feb. 29, 2024

(30) Foreign Application Priority Data
Mar. 11, 2021 (WO) .............. PCT/CN2021/080133

(51) Int. Cl.
*H01Q 3/24* (2006.01)
*H01Q 21/06* (2006.01)
(Continued)

(52) U.S. Cl.
CPC ............. *H01Q 3/24* (2013.01); *H01Q 21/061* (2013.01); *H01Q 21/293* (2013.01); *H01Q 1/246* (2013.01)

(58) Field of Classification Search
CPC .. H01Q 3/24; H01Q 3/26; H01Q 3/36; H01Q 21/0025; H01Q 21/061; H01Q 21/24;
(Continued)

(56) References Cited

U.S. PATENT DOCUMENTS 9,774,098 B2 * 9/2017 Jidhage .................... H01Q 3/36
11,444,376 B2 * 9/2022 Abdalla ............... H01Q 21/061
(Continued)

FOREIGN PATENT DOCUMENTS

WO   2020043310 A1   3/2020
WO   2020089458 A1   3/2020

OTHER PUBLICATIONS

Shipley, et al., "Mutual Coupling-Based Calbration of Phased Array Antennas," International Conference on Phased Array Systems and Technology, 2000, IEEE, pp. 529-532.
(Continued)

*Primary Examiner* — Jason M Crawford
(74) *Attorney, Agent, or Firm* — Withrow & Terranova, PLLC

(57) ABSTRACT

Embodiments described herein relate to an active antenna system. The active antenna system comprises an antenna array wherein the antenna array comprises a plurality of sub-arrays; a plurality of feed networks configured to couple respective signals from the plurality of sub-arrays to respective radio chains; and at least one coupling path configured to provide coupling between a first feed network and a second feed network, wherein the first feed network is coupled to a first sub-array and the second feed network is coupled to a second sub-array, wherein the coupling is of a higher magnitude than a lowest magnitude of mutual aperture couplings occurring between antenna elements in the first sub-array and the second sub-array.

17 Claims, 15 Drawing Sheets

(51) Int. Cl.
*H01Q 21/29* (2006.01)
*H01Q 1/24* (2006.01)

(58) Field of Classification Search
CPC .... H04B 17/0085; H04B 17/10; H04B 17/11; H04B 17/12; H04B 17/15
See application file for complete search history.

(56) References Cited

U.S. PATENT DOCUMENTS

| | | | | |
|---|---|---|---|---|
| 2004/0032365 | A1* | 2/2004 | Gottl | H01Q 3/267 |
| | | | | 342/368 |
| 2004/0032366 | A1* | 2/2004 | Langenberg | H01Q 3/267 |
| | | | | 342/368 |
| 2007/0205955 | A1* | 9/2007 | Korisch | H01Q 21/24 |
| | | | | 343/797 |
| 2007/0285312 | A1* | 12/2007 | Gao | H01Q 3/40 |
| | | | | 342/367 |
| 2010/0117913 | A1* | 5/2010 | Jung | H01Q 1/246 |
| | | | | 343/724 |
| 2013/0265203 | A1 | 10/2013 | Ermutlu et al. | |
| 2014/0347248 | A1* | 11/2014 | Stjernman | H01Q 3/30 |
| | | | | 343/893 |
| 2015/0195001 | A1* | 7/2015 | Barker | H04B 7/0615 |
| | | | | 342/367 |
| 2020/0014105 | A1* | 1/2020 | Braun | H01Q 3/267 |
| 2022/0069874 | A1* | 3/2022 | Wu | H04B 7/0617 |
| 2022/0131578 | A1* | 4/2022 | Junttila | H01Q 21/24 |
| 2023/0142772 | A1* | 5/2023 | Johansson | H01Q 21/26 |
| | | | | 342/372 |
| 2024/0072434 | A1* | 2/2024 | Braun | H01Q 21/24 |

OTHER PUBLICATIONS

International Search Report and Written Opinion for International Patent Application No. PCT/SE2021/051143, mailed Jan. 18, 2022, 13 pages.

* cited by examiner (a) (b)

ACTIVE ANTENNA SYSTEM COMPRISING COUPLING PATHS BETWEEN FEED NETWORKS

This application is a 35 U.S.C. § 371 national phase filing of International Application No. PCT/SE2021/051143, filed Nov. 16, 2021, which claims the benefit of International Application No. PCT/CN2021/080133, filed Mar. 11, 2021, the disclosures of which are incorporated herein by reference in their entireties.

TECHNICAL FIELD

Embodiments described herein relate to an active antenna system comprising a coupling path between feed networks in the antenna system, wherein the coupling path is configured to increase coupling between antenna elements in the active antenna system.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

One key attribute for future Fifth Generation (5G) radio systems is increased capacity in radio networks. Beamforming is one technology that will be used by 5G radio systems to provide the desired increased capacity in an efficient manner. In particular, a 5G radio base station will utilize a large antenna array including tens if not hundreds of antennas, which are also referred to herein as antenna elements. Each antenna element (or each sub-array of antenna elements) is connected to a radio transceiver path. Applying proper scaling in the transceiver paths enables beamforming by efficient control of spatial coherent additions of desired signals and coherent subtractions of unwanted signals. Such beamforming is used both to enable high antenna gain to a desired User Equipment (UE) as well as to enable parallel communication to several UEs using the same time/frequency resource by using orthogonal spatial communication paths (i.e., by using orthogonal beams).

One issue that arises when implementing a radio base station that utilizes beamforming is that there are variations in gain and phase between different antenna paths (i.e., between different radio transmitter paths and between different radio receiver paths). To enable precise beamforming, full control of vector additions of high frequency radio signals is needed. Hence, very accurate control of amplitude and phase may be required. This accuracy is needed in every transceiver path. In order to achieve this accuracy, a calibration procedure may be applied to compensate for amplitude and phase variations between different transceiver paths.

The calibration procedure may comprise a self-calibration of an active antenna system using mutual aperture couplings between antenna elements or between sub-arrays in the antenna array, simultaneous transmission orthogonal test signals, and measurements of resulting coupled path signals. By using the mutual aperture couplings between the antenna elements, measurements can be obtained using the coupled path signals such that neither an anechoic chamber nor dedicated coupler elements are required. In addition, by using orthogonal test signals, multiple measurements can be obtained simultaneously. In this manner, the self-calibration procedure can be performed in an efficient manner.

FIG. 1 illustrates an example embodiment of a radio system 100 that provides self-calibration for an antenna array according to embodiments of the present disclosure. The radio system 100 is also referred to herein as a beamforming transceiver. The radio system 100 is preferably a radio access node in a cellular communications network (e.g., a base station in a 3GPP 5G NR network). However, the radio system 100 may alternatively be, for example, an access point in a local wireless network (e.g., an access point in a WiFi network), a wireless communication device (e.g., a UE in a 3GPP 5G NR network), or the like. The radio system 100 performs beamforming via an antenna array. This beamforming may be, e.g., analog beamforming, which is performed by controlling gain and phase for each antenna branch via respective gain and phase control elements. However, it should be appreciated that, in some other embodiments, the radio system 100 may perform, e.g., hybrid beamforming, i.e., perform beamforming partly in the digital domain and partly in the analog domain or may perform digital beamforming (i.e., beamforming fully in the digital domain), which may be time domain or frequency domain digital beamforming.

As illustrated, the radio system 100 includes a processing unit 102 and an active antenna system 104. In some examples, the active antenna system 104 is implemented as one or more radio ASICs, and the processing unit 102 is a baseband processing unit implemented as, e.g., one or more processors such as, e.g., one or more CPUs, one or more baseband ASICs, one or more Field Programmable Gate Arrays (FPGAs), or the like, or any combination thereof.

The active antenna system 104 comprises an antenna array comprising a plurality of sub-arrays. Each sub-array comprises a one or more Antenna Elements (AEs). The active antenna system 104 may comprise radio chains for each sub-array. As an example, each radio chain may comprise a gain control element and a phase control element that are controlled by the processing unit 102 to provide gain and phase calibration between the radio chains and, in some embodiments, analog beamforming for signals transmitted by the radio system 100. Note that analog calibration and analog beamforming are shown herein as an example; however, the present disclosure is not limited thereto.

The processing unit 102 includes a self-calibration subsystem 106. The self-calibration subsystem 106 includes a controller 108, a test signal generator and measurement function 110 including in this example encoders 112 and decoders 114, and a measurement processing function 116. The controller 108 generally operates to control the self-calibration subsystem 106 and the active antenna system 104 to perform a self-calibration procedure as described herein. The test signal generator and measurement function 110 includes the encoders 112 that generate orthogonal test signals, for example, in real-time and in the time domain using different orthogonal codes. The orthogonal test signals are provided to the active antenna system 104 for simultaneous transmission by respective transmit sub-arrays.

In response to the simultaneous transmission of the orthogonal test signals, the active antenna system 104 provides received signals that are received via at least some receive sub-arrays as a result of mutual couplings between the transmit and receive sub-arrays. Each of these received signals is a combination of signals received at the respective receive sub-array from the transmit sub-array during simultaneous transmission of the orthogonal test signals due to mutual coupling. As such, these received signals are also referred to herein as "combined" signals. For each of these combined signals, the decoders 114 include decoders that simultaneously decode the combined signal, preferably in the time domain, to provide separate receive signals received via the respective receive sub-array from a limited subset of the transmit sub-arrays. After decoding, the resulting decoded signals are stored as measurements. Multiple measurement steps are performed until all desired measurements are obtained.

Once all of the desired measurements are obtained, the measurement processing function 116 processes the measurements to determine gain and phase calibration values for the radio chains of the active antenna system 104. The controller 108 then controls the gain and phase control elements in the transmit and receive branches of the active antenna system 104 in accordance with the determined gain and phase calibration values.

Radio products employing the calibration procedure described above based on mutual aperture coupling as described above (MCAC) have building practice, modularity and cost advantages compared to traditional AC solution based on couplers.

The calibration procedure as described above is based on a measured calibration signal path from one radio chain that is configured in transmission mode, to neighboring radio chains that are configured to receiving mode. The signal path goes via the antenna mutual aperture coupling that is present in any antenna array.

The calibration procedure as described above therefore depends on the mutual aperture coupling occurring between the antenna elements having a magnitude within a certain range. The calibration procedure may, in particular, exploit antenna properties that the mutual aperture coupling is stronger for the closest neighboring elements in the array geometry. However, for some antenna design choices, the mutual aperture coupling between antenna elements may be very low even for closely spaced elements. This causes less signal to be coupled through the mutual aperture coupling, deteriorating the SINR of the measured mutual aperture coupling signal. Poor SINR in its turn degrades the calibration accuracy of the solution. Interference may originate from co-located equipment, user equipments (UEs) or any other interference source in the air.

SUMMARY

According to some embodiments there is provided an active antenna system. The active antenna system comprises an antenna array wherein the antenna array comprises a plurality of sub-arrays; a plurality of feed networks configured to couple respective signals from the plurality of sub-arrays to respective radio chains; and at least one coupling path configured to provide coupling between a first feed network and a second feed network, wherein the first feed network is coupled to a first sub-array and the second feed network is coupled to a second sub-array, wherein the coupling is of a higher magnitude than a lowest magnitude of mutual aperture couplings occurring between antenna elements in the first sub-array and the second sub-array.

BRIEF DESCRIPTION OF THE DRAWINGS

For a better understanding of the embodiments of the present disclosure, and to show how it may be put into effect, reference will now be made, by way of example only, to the accompanying drawings, in which.

DESCRIPTION

Figure 1:
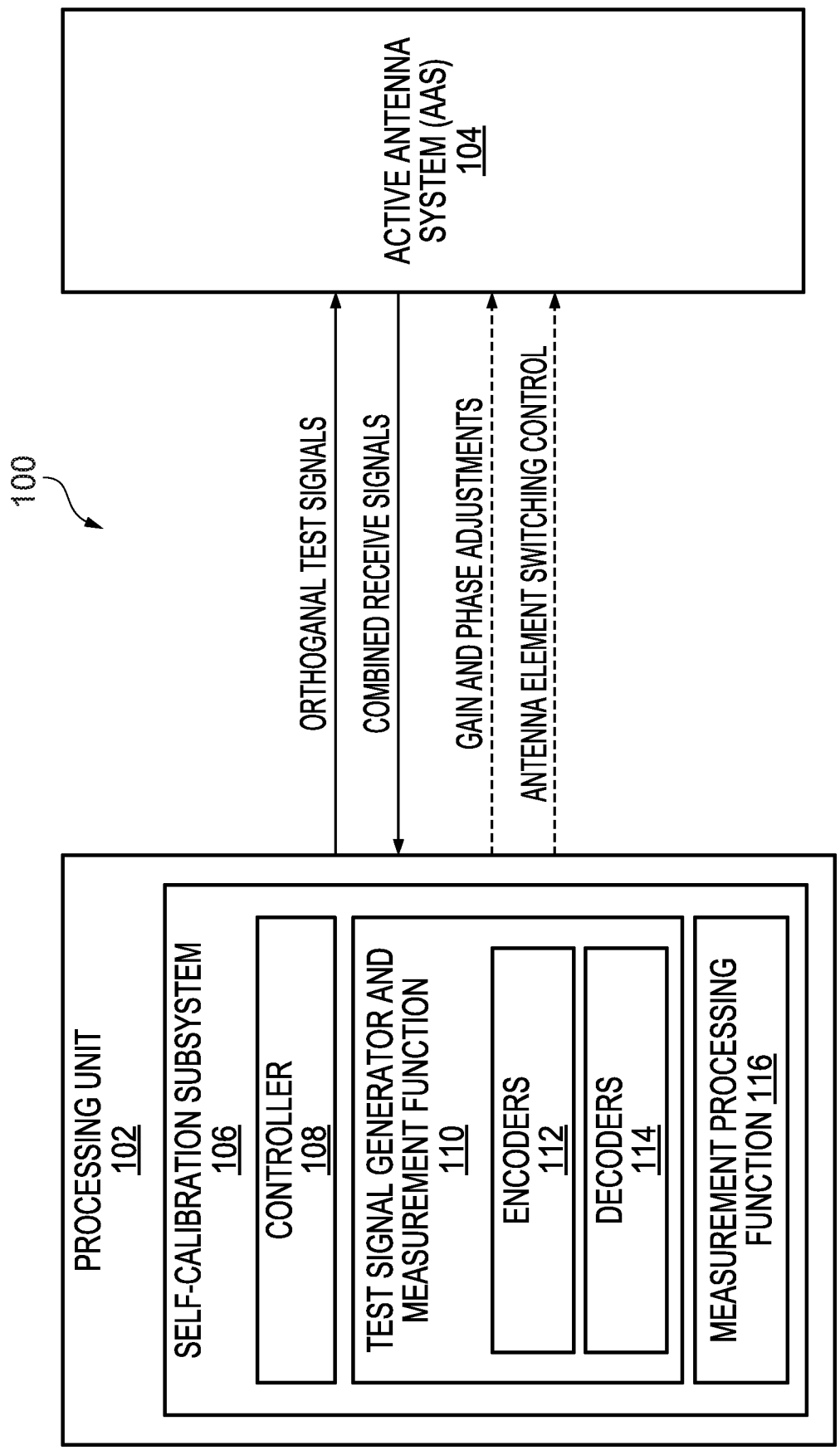
FIG. 1 illustrates an example embodiment of a radio system 100 that provides self-calibration for an antenna array.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Some antenna design parameters that have been found to impact the magnitude of the mutual aperture coupling are relative element-to-element distance and antenna subarray size. The relative element to element distance is expressed in fractions of the radio frequency wavelength and is therefore varying across carrier frequency. For very broadband antenna designs it may therefore be difficult to choose the optimal antenna element distance. The antenna subarray size is in its turn chosen based on desired beam properties and maximum antenna gain requirements. Both the abovementioned effects can impact the magnitude of the mutual aperture coupling and are difficult or even impossible to influence for a given antenna design/requirement.

An active antenna system (AAS) for mobile cellular communication networks is normally required to have a wide primary coverage angular range in the horizontal plane, while in the vertical plane, the primary coverage angular range is significantly smaller. Therefore, an AAS typically consists of an antenna array of vertical sub-arrays in order to optimize the array aperture and number of radio chains with respect to the desired primary coverage angular range. (The primary coverage angular range is here defined as the angular range where the AAS is to ensure high antenna gain and by that high Effective Isotropic Radiated Power (EIRP) and Effective Isotropic Sensitivity (EIS).)

Figure 2:
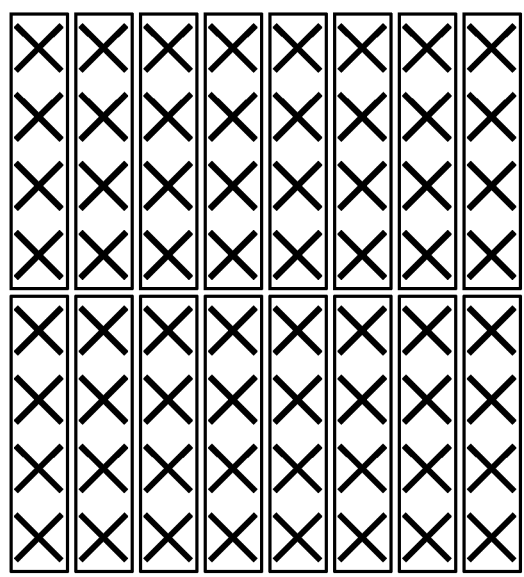
FIG. 2a illustrates an example of an AAS product that has 32 radio chains feeding an array of vertical sub-arrays in a 2 rows by 8 columns configuration.
FIG. 2b illustrates an example of an AAS product comprising 64 radio chains feeding an array of vertical sub-arrays each comprising four antenna elements in a 4 rows by 8 columns configuration.
Figure 2:
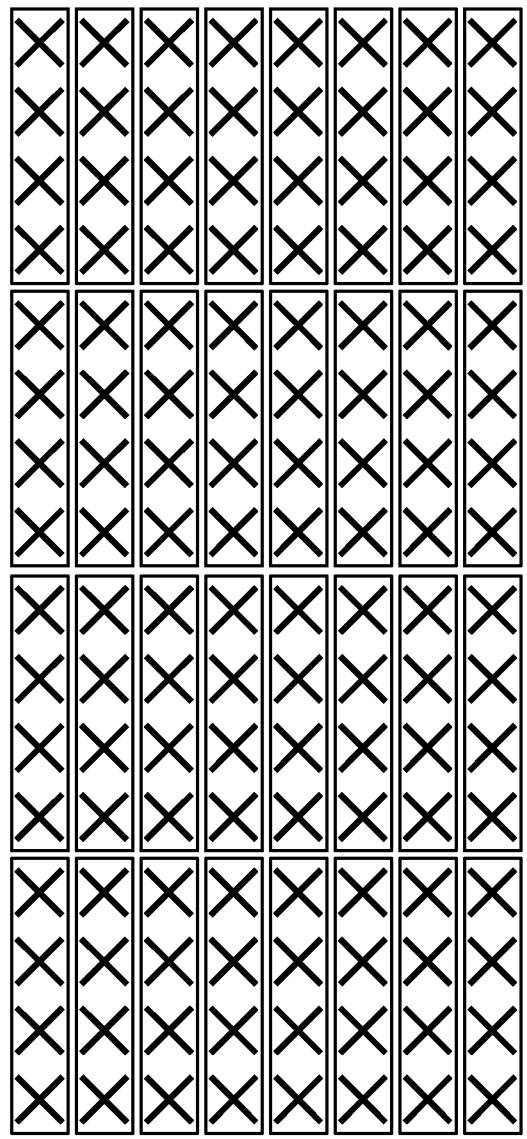

FIG. 2a illustrates an example of an AAS product that has 32 radio chains feeding an array of vertical sub-arrays in a 2 rows by 8 columns configuration. To obtain high antenna gain given the few radio chains, the vertical sub-arrays may need to be quite large. Sub-arrays comprising four antenna elements is assumed in this example. FIG. 2b illustrates an example of an AAS product comprising 64 radio chains feeding an array of vertical sub-arrays each comprising four antenna elements in a 4 rows by 8 columns configuration. Even larger vertical sub-arrays, comprising for example 6 or more antenna elements may also attractive for many applications. It will be appreciated that a subarray may comprise any number of antenna elements arranged in any configuration. It will also be appreciated that an antenna array may comprise any number of sub-arrays arranged in any configuration. Antenna elements in an array may have orthogonal polarizations.

Figure 3:
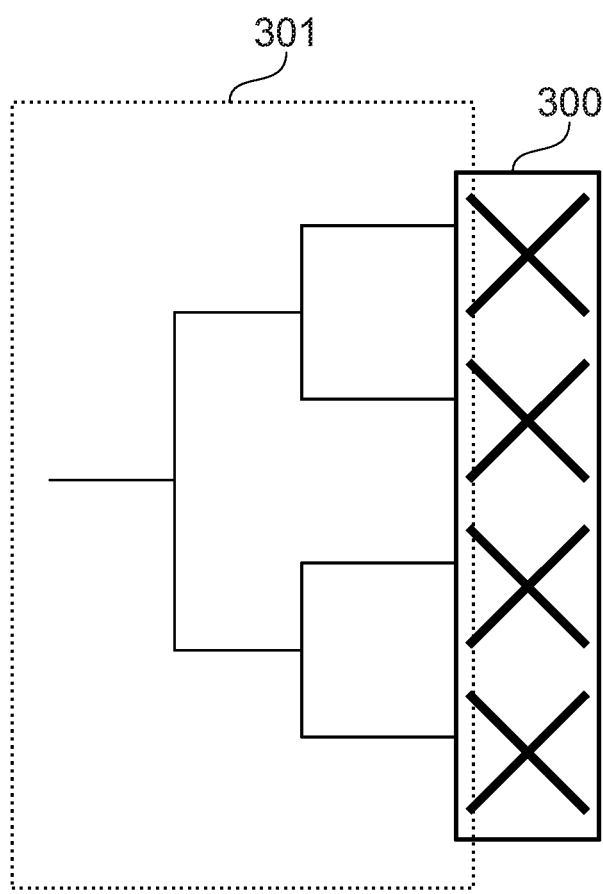
FIG. 3 illustrates an example of 4-element sub-array coupled to a feed network.
Figure 4:
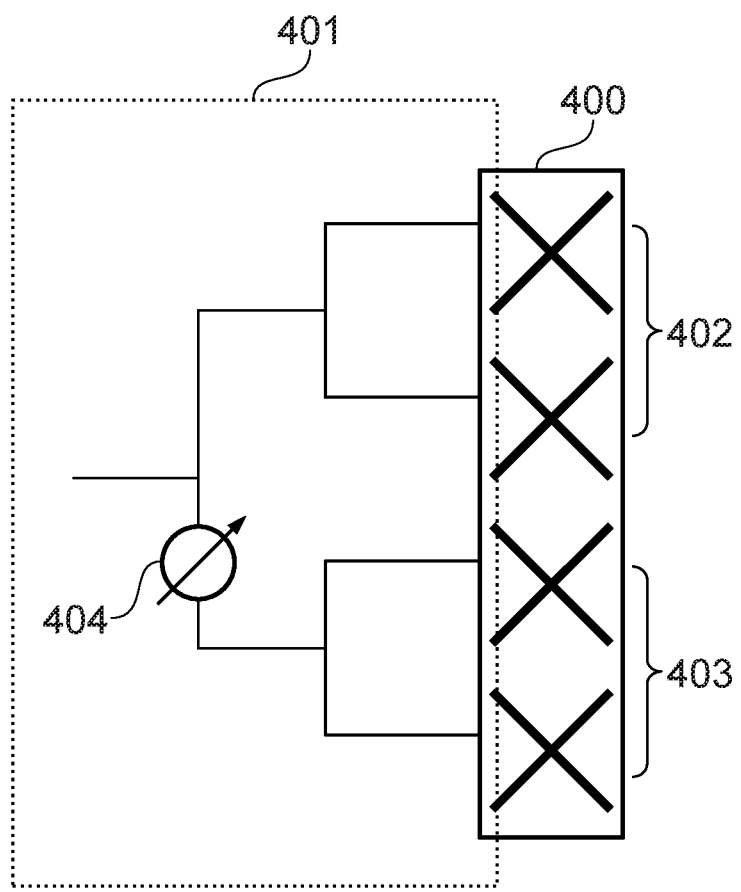
FIG. 4 illustrates an example of 4-element sub-array coupled to a feed network.

FIGS. 3 and 4 illustrates examples of how a feed network may be coupled to a sub-array. In this example sub-array comprising four antenna elements stacked in a first direction are used. However, it will be appreciated that a sub-array may comprise any number of antenna elements arranged in any configuration.

FIG. 3 illustrates an example of 4-element sub-array 300 coupled to a feed network 301. In this example only one feed network 301 is illustrated. It will however be appreciated that the subarray may be coupled to two feed networks, one for each polarization.

FIG. 4 illustrates an example of 4-element sub-array 400 coupled to a feed network 401. Again, only one feed network is illustrated, however the sub-array 400 may be coupled to two feed networks, one for each polarization. In this example, the 4-element sub-array comprises two sub-sub-arrays 402 and 403 each comprising 2 antenna elements. The sub-sub-arrays 402 and 403 are both coupled to the feed network 401, by an adjustable phase shifter 404 is coupled to the sub-sub-array 403 to electrical down tilt of the sub-array 400.

Particularly when utilizing large sub-arrays, the mutual aperture coupling between neighboring sub-arrays can become too low for efficient use of the aforementioned calibration procedure. In principal, the mutual aperture coupling between neighboring sub-arrays in the vertical plane will decrease the larger the vertical sub-arrays are. But also, to have enough mutual aperture coupling between the neighboring sub-arrays in the horizontal plane may be challenging when for instance sub-arrays with electrical down tilt (either fixed or variable using phase shifters in the sub-array feed network) are used. In this case the mutual aperture coupling levels can vary significantly with electrical down tilt angle as well as over frequency.

Embodiments described herein relate to an active antenna system comprising at least one coupling path configured to provide coupling between a first feed network and a second feed network in the active antenna array. The at least one coupling path is configured such that the coupling is of a higher magnitude than a lowest magnitude of mutual aperture couplings occurring between antenna elements in a first sub-array coupled to the first feed network and a second sub-array coupled to the second feed network.

In other words, in embodiments described herein, at least one coupling path is artificially introduced into the active antenna system in order to achieve suitable coupling levels to ensure proper and efficient calibration performance. In some examples, the at least one coupling path may be introduced between sub-array ports where the aperture coupling is very weak for the purpose to introduce new coupling paths that efficiently enhances the performance of the calibration and at the same time minimizes any interference between the at least one coupling path and the mutual aperture coupling.

Figure 5:
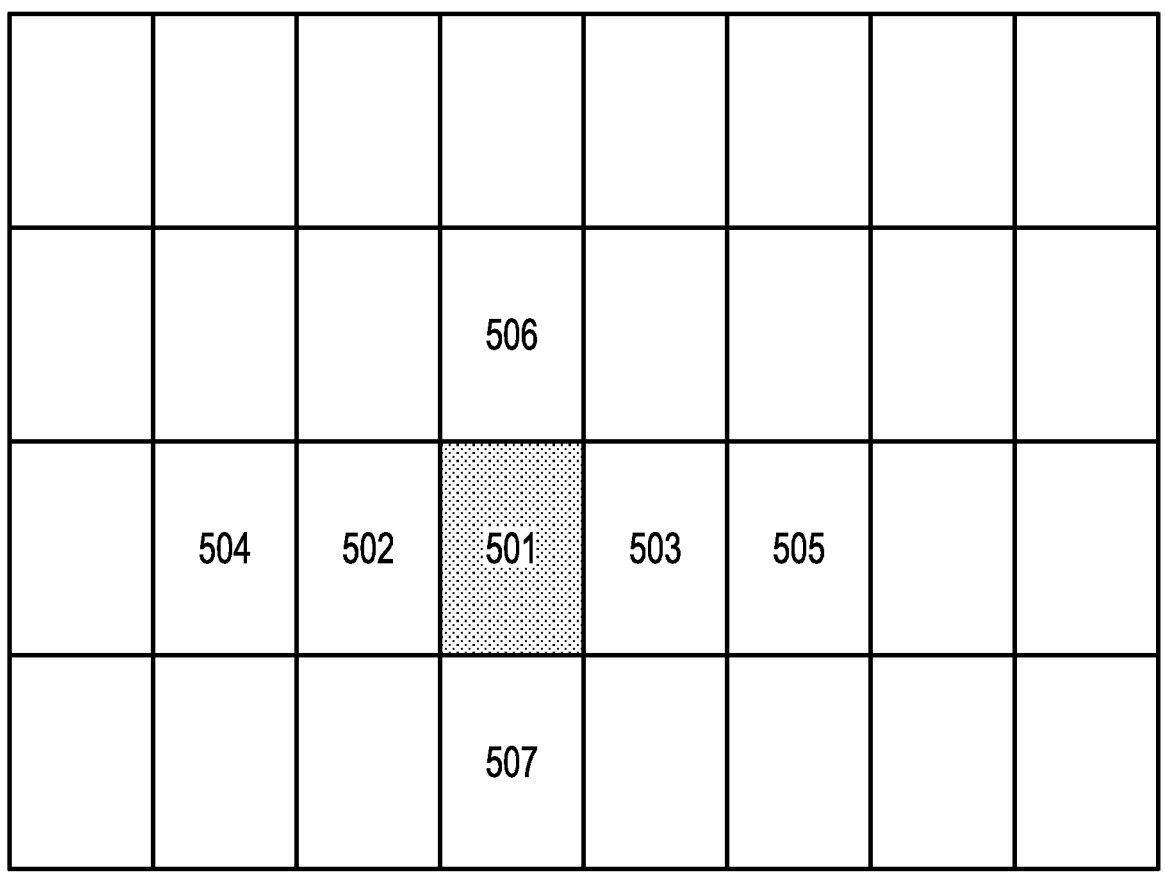
FIG. 5 illustrates a portion of an example antenna array.

FIG. 5 illustrates a portion of an example antenna array. Each box in the grid represents an a sub-array comprising one or more antenna elements.

The calibration procedure measures the coupled signal from radio chain to another radio chain. The mutual aperture coupling occurs over the air and is normally strongest between the most closely spaced antenna elements. This is exploited in the calibration procedure.

In the example of FIG. 5, antenna element 501 is in transmission mode. Antenna elements 502 and 503 are the closest horizontal relative neighbour antenna elements in the antenna array.

Antenna elements 504 and 505 are the second closest horizontal relative neighbour antenna elements in the array. Antenna elements 506 and 507 are the closest vertical relative neighbour antenna elements in the array.

For a symmetrical antenna array design the mutual aperture coupling levels are very similar for all of the transmission antenna element's relative neighbours. Typical mutual aperture coupling levels may vary with antenna designs, but for arrays with vertically stacked subarrays the typical levels may be around −20 to −25 dB for 502 and 503, −30 to −35 dB for 504 and 505, −30 to −35 dB for 506 and 507. In general, the mutual aperture coupling between antenna elements in two subarrays may be in the range −50 dB to −15 dB.

The mutual aperture coupling between co-polarized antenna elements may be similar to the mutual aperture coupling between cross-polarised antenna elements. The mutual aperture coupling between cross-polarized antenna elements is usually a bit lower that the mutual aperture coupling between co-polarised antenna elements, but the mutual aperture coupling between cross-polarised antenna elements may still be used in the calibration procedure.

For some antenna designs the above expected mutual aperture coupling levels cannot be reached. In some examples, one or more relative neighbour antenna elements has a mutual aperture coupling that is lower than expected. Furthermore, the mutual aperture coupling may vary with frequency, so lower than expected mutual aperture coupling may occur in only parts of the frequency band.

There may be a number of different and cooperating causes for low mutual aperture coupling. In some cases, considerable effort has been made in the design of the antenna elements and antenna array to reduce mutual aperture coupling. For example, in normal traffic mode (normal transmit and receive operation of the active antenna system) mutual aperture coupling has negative effects since it may cause amplitude and phase variations due to embedded element ripple. Also, in DL mode, mutual aperture coupling may cause reverse intermodulation in that the DL signal from one branch is coupled to the neighbouring branch DL chain, which may create nonlinear effects. However, during the calibration procedure the mutual aperture coupling is exploited in that it provides the antenna calibration measurement path. In the calibration procedure the antenna array may be configured in a specific transmission/reception pattern to allow for the measurements to be performed. It is the objective of the calibration procedure to provide good enough calibration accuracy without requiring too high mutual coupling.

In these cases, there may therefore be a trade-off between requirements for the calibration procedure for adequate mutual aperture coupling and other design objectives to reach acceptable mutual aperture coupling level for both antenna radiating properties and calibration performance.

In some examples, more fundamental effects cause low mutual aperture coupling. This effect can be antenna elements combined into large subarrays together with fixed or reconfigurable downtilt, element-element separation, etc.

Figure 6:
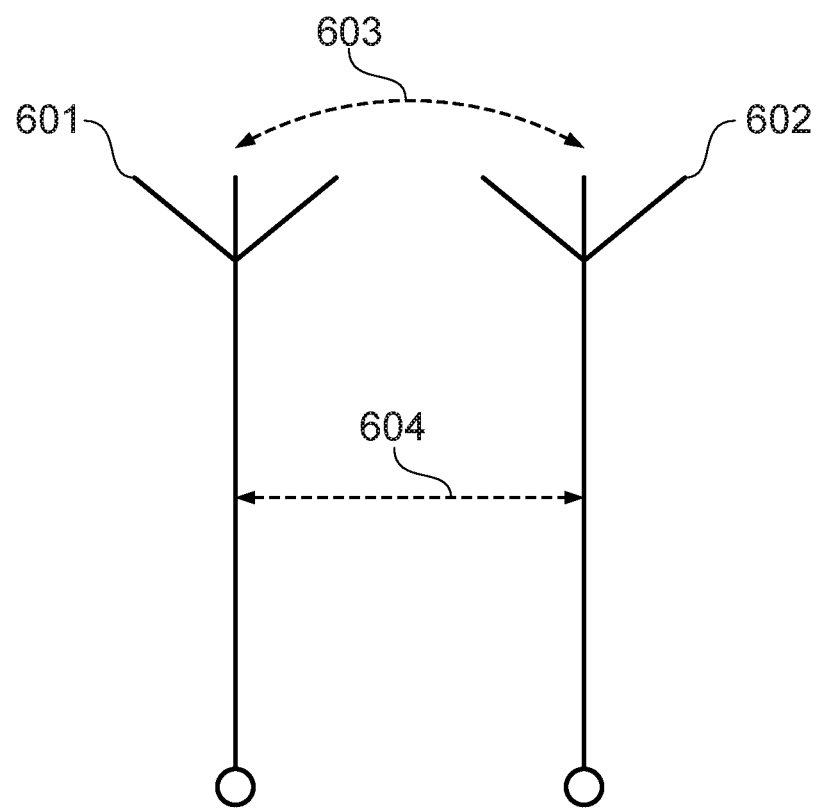
FIG. 6 illustrates the coupling paths between two antenna elements.

FIG. 6 illustrates the coupling paths between two antenna elements. It will be appreciated that similar coupling paths may exist between sub-arrays comprising one or more antenna elements.

The total coupling level between two antenna elements 601 and 602 is the sum of the mutual aperture coupling (also referred to as Over-the-air (OTA) coupling) 603 and the coupling in the antenna feed network 604. The total coupling as seen at the port of the feed networks is the sum of the two coupling components 603 and 604. Normally the coupling in the feed network is several order of magnitudes smaller than the mutual aperture coupling, and gives a negligible impact to the total coupling. But if the distribution coupling is increased by a coupling path, its contribution can be made significant.

Figure 7:
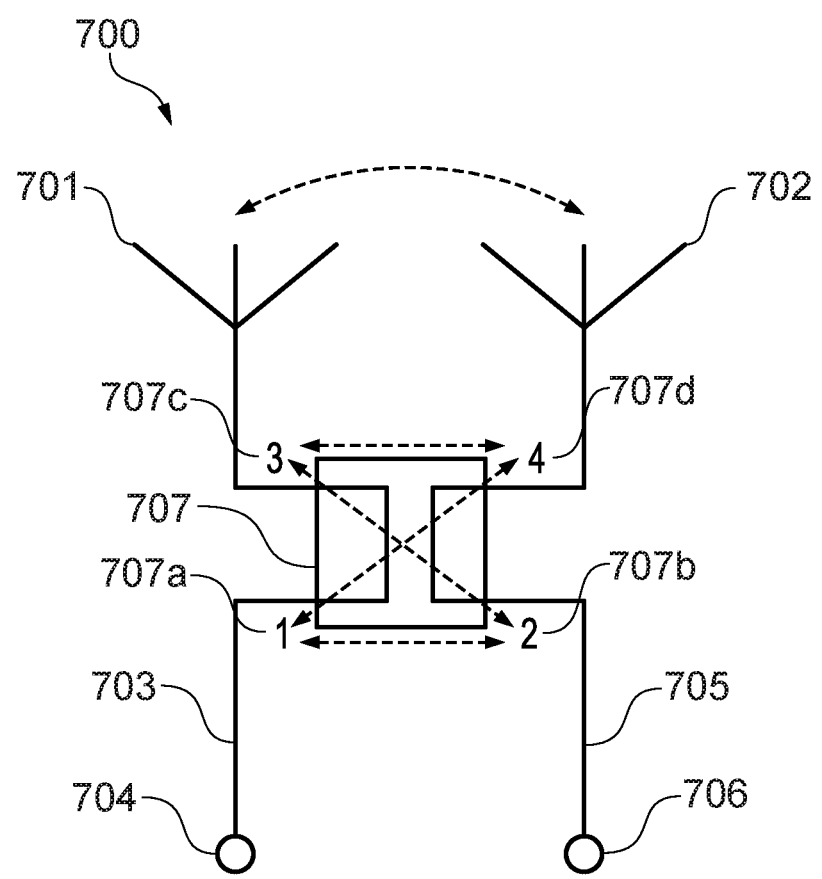
FIG. 7 illustrates an example of an active antenna system according to some embodiments.

FIG. 7 illustrates an example of an active antenna system 700 according to some embodiments.

The active antenna system 700 comprises an antenna array wherein the antenna array comprises a plurality of sub-arrays. In this example, only a first antenna element 701 and a second antenna element 702 are illustrated. It will be appreciated that the first antenna element and the second antenna element may in some examples form part of the same subarray, or different subarray.

The active antenna system 700 comprises a plurality of feed networks configured to couple respective signals from the plurality of sub-arrays to respective radio chains. In this example, the active antenna system 700 comprises a first feed network 703 configured to couple signals from a first subarray comprising at least the first antenna element 701 to a first radio chain (not illustrated), for example, via a first port 704. The active antenna system 700 further comprises a second feed network 705 configured to couple signals from a second subarray comprising at least a second antenna element 702 to a second radio chain (not illustrated), for example, via a second port 706.

For simplicity, FIG. 7 illustrates only two feed networks and two subarrays (each illustrated as comprising a single antenna element). It will however be appreciated that any number of subarrays may be present, each comprising any number of antenna elements. Each subarray may be coupled to one or two feed networks.

The active antenna system 700 further comprises at least one coupling path (in this example, coupling path 707) configured to provide coupling between the first feed network and the second feed network. The coupling provided by the at least one coupling path is of a higher magnitude than a lowest magnitude of mutual aperture couplings occurring between antenna elements in the first sub-array and the second sub-array. In other words, the at least one coupling path provides coupling of a magnitude that is at least greater than what ever the lowest coupling is between antenna elements in the first sub-array and the second sub-array.

For the example of FIG. 7 therefore, the coupling path 707 provides a coupling of a greater magnitude than the mutual aperture coupling between antenna elements 701 and 702. For example, the coupling may have a magnitude x, wherein −50 dB≤x≤−15 dB.

In some examples, the wherein the at least one coupling path is positioned to couple together signals from antenna elements that have mutual aperture coupling that is lower than an expected antenna coupling. The expected antenna coupling may be a design choice that may, for example, be dictated by an acceptable SINR ratio for the calibration procedure.

The coupling is used in a calibration measurement path in a mutual coupling based antenna calibration function (such as described in the background section) to calibrate phase settings and/or amplitude settings of a first radio chain coupled to the first feed network and a second radio chain coupled to the second feed network.

In this example, the coupling path 707 is realized by arranging the first feed network and the second feed network to provide a directional coupler between the first feed network 703 and the second feed network 705.

A directional coupler (for example, implemented in stripline or microstrip line) is a technology which is based on strong coupling between two closely spaced portions of lines. In many applications, a directional coupler has one port terminated by a matched load, but in this embodiment no termination is needed since all four ports (707a to 707d) are used.

The effective 4-ports 707a to 707d as illustrated in FIG. 7 provides the property that the coupling is strongest between ports 707a and 707b and 707c and 707d. The diagonal coupling between ports 707a and 707d and 707b and 707c is weaker by the factor of coupler directivity. The directivity of a directional coupler may depend on many design details but it may be robustly designed to be greater than 10 dB. It will be appreciated that the coupling path 707a to 707b is what is desired by the inserting of the coupling path for the purpose of improved performance of the calibration procedure. The diagonal coupling paths 707a to 707d and 707b to 707c may, in some cases, be considered undesirable because they introduce a direct leakage path between signals to/from the antenna element apertures that will affect the beamforming performance of the antenna array. The coupling path 707c to 707d may introduce a coupling between antenna apertures that may, in some cases be considered undesirable, and may affect beamforming performance through secondary affects causing beamshape ripple and increased sidelobe levels.

Figure 8:
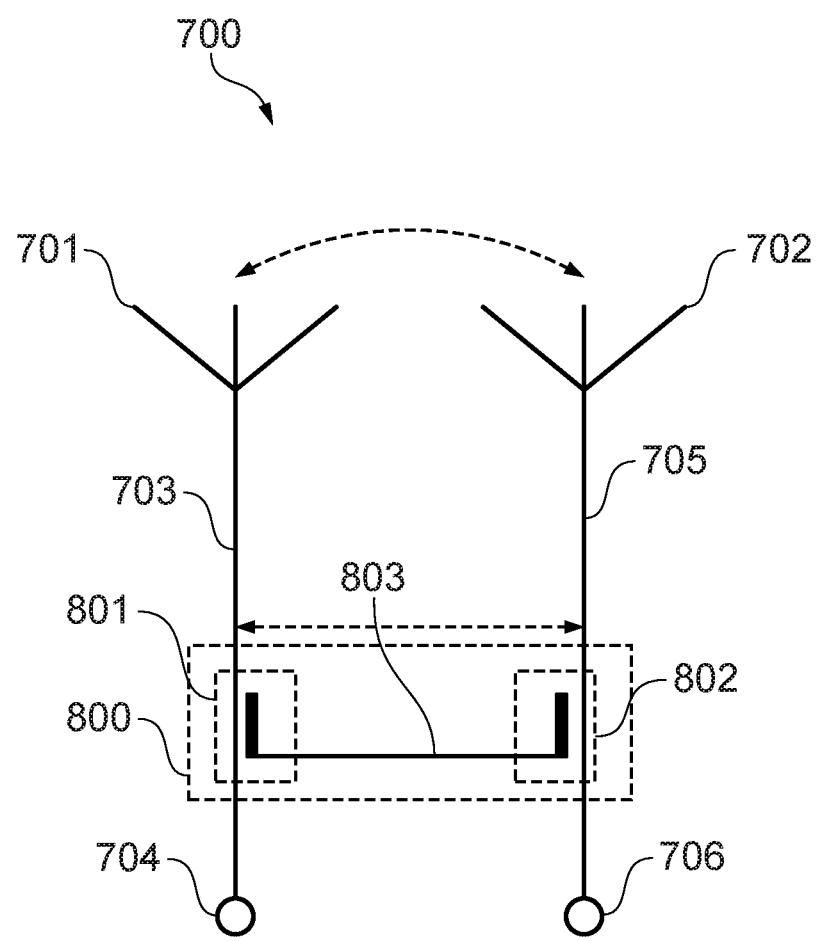
FIG. 8 illustrates a coupling path implemented in the active antenna system of FIG. 6.
Figure 9:
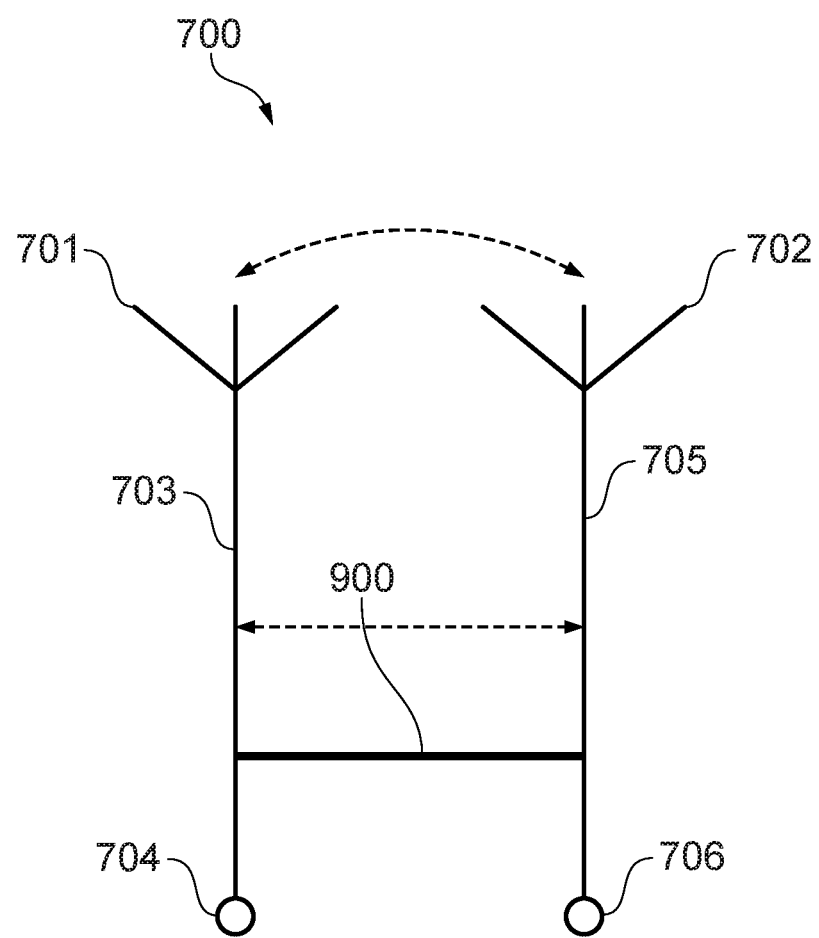
FIG. 9 illustrates a further different example of a coupling path implemented in the active antenna system of FIG. 6.
Figure 10:
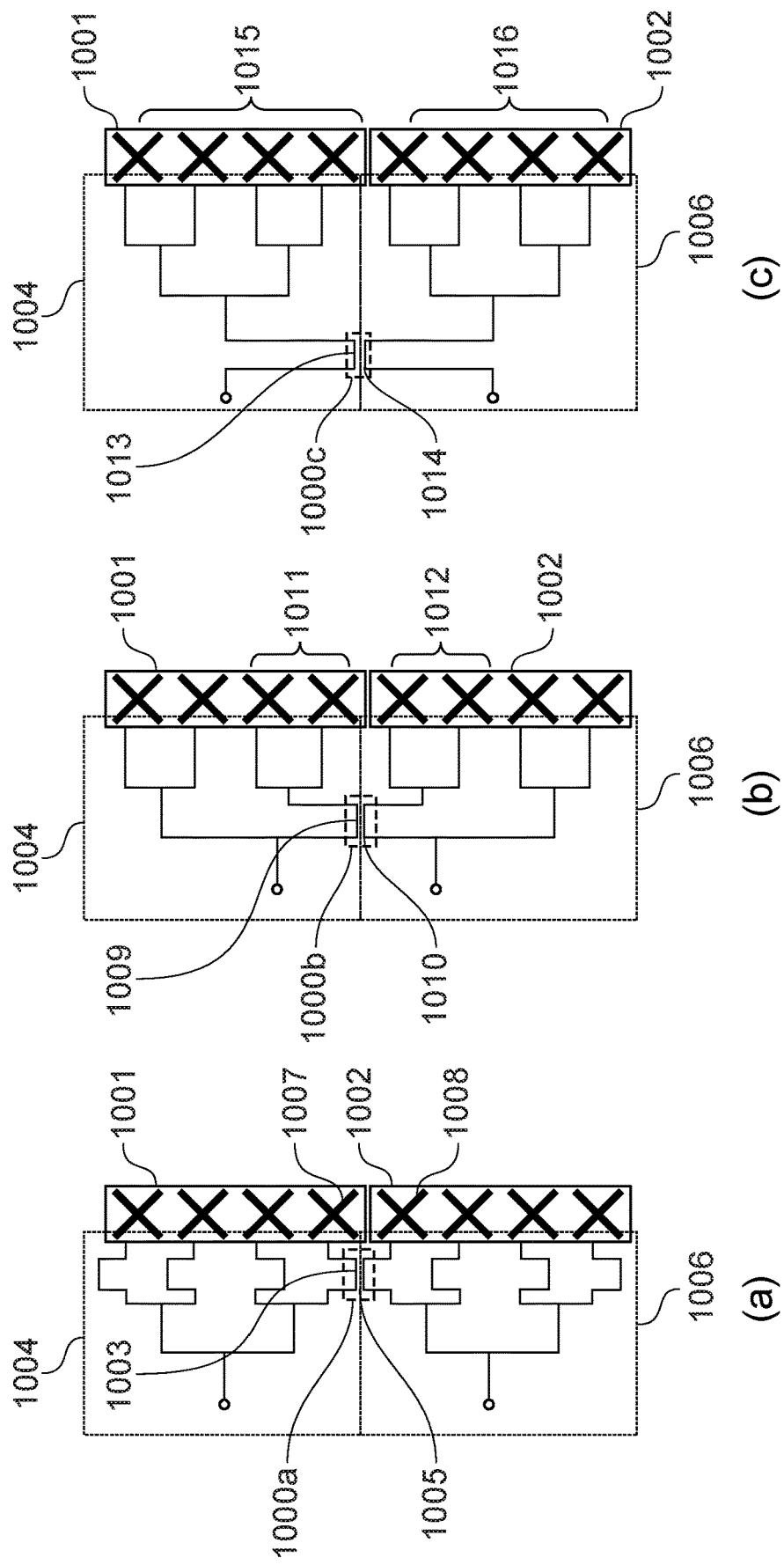
FIGS. 10a, 10b and 10c illustrate examples in which a coupling path 1000a, 1000b or 1000c is configured to couple the feed networks of two sub-arrays 1001 and 1002.

FIGS. 8 and 9 illustrate further example of how a coupling path may be implemented.

FIG. 8 illustrates a coupling path 800 implemented in the active antenna system of FIG. 6. In this example, the coupling path 800 comprises: a first directional coupler 801 coupled to the first feed network 703; a second directional coupler 802 coupled to the second feed network 705; and a signal path 803 between the first directional coupler 801 and the second directional coupler 802. The coupling path 800 has the same advantage relating to coupler directivity as the coupling path 707 of FIG. 7.

FIG. 9 illustrates a further different example of a coupling path 900 implemented in the active antenna system of FIG. 6. In this example, the coupling path 900 comprises a T-split signal path between the first feed network 703 and the second feed network 705. This T-line connection may have a high impedance so as to not impact the antenna distribution impedance too much. The T-line solution may need specific line length tuning and/or impedance matching means (e.g. stubs) to provide the desired coupling properties.

Both of the coupling paths 800 and 900 may be considered advantageous in some circumstances as they couple the first feed network 703 and the second feed network 705 without needing modification of the routing of the first feed network 703 or the second feed network 705. The coupling is instead created through an extra line between the first feed network 703 and the second feed network 705. These coupling paths may in some cases be retroactively introduced into a pre-designed active antenna system.

It will be appreciated that an active antenna system 700 may comprise any number of coupling paths, and any combination of types of coupling path, including those illustrated in FIGS. 7 to 9.

FIGS. 10a to 12c illustrate various examples of where a coupling path may be positioned to couple together a first feed network and a second feed network. In these examples illustrated in FIGS. 10a to 12c, the sub-arrays are each arranged with a number of antenna elements stacked in a first direction. In these examples, the number of antenna elements in each sub-array is 4.

FIGS. 10a, 10b and 10c illustrate examples in which a coupling path 1000a, 1000b or 1000c is configured to couple the feed networks of two sub-arrays 1001 and 1002. In this example, the sub-arrays 1001 and 1002 are adjacent to each other in the antenna array in the first direction.

In FIG. 10a, the coupling path 1000a is configured to couple a first section 1003 of a first feed network 1004 to a second section 1005 of a second feed network 1006. The first section 1003 of the first feed network 1004 is coupled to only a first antenna element 1007. The second section 1005 of the second feed network 1006 is coupled to only a second antenna element 1008.

In FIG. 10b, the coupling path 1000b is configured to couple a third section 1009 of the first feed network 1004 to a fourth section 1010 of the second feed network 1006, wherein the third section 1009 of the first feed network 1004 is coupled to a first plurality 1011 of antenna elements and the fourth section 1010 of the second feed network 1006 is coupled to a second plurality 1012 of antenna elements.

In FIG. 10c, the coupling path 1000c is configured to couple a fifth section 1013 of the first feed network 1004 to a sixth section 1014 of the second feed network 1006, wherein the fifth section 1013 of the first feed network 1004 is coupled to a third plurality 1015 of antenna elements and the sixth section 1014 of the second feed network 1006 is coupled to a fourth plurality 1016 of antenna elements.

It will be appreciated that a coupling path between the subarrays may be either between the feed networks having the same polarization or, alternatively, between the feed networks with orthogonal polarizations.

Figure 11A:
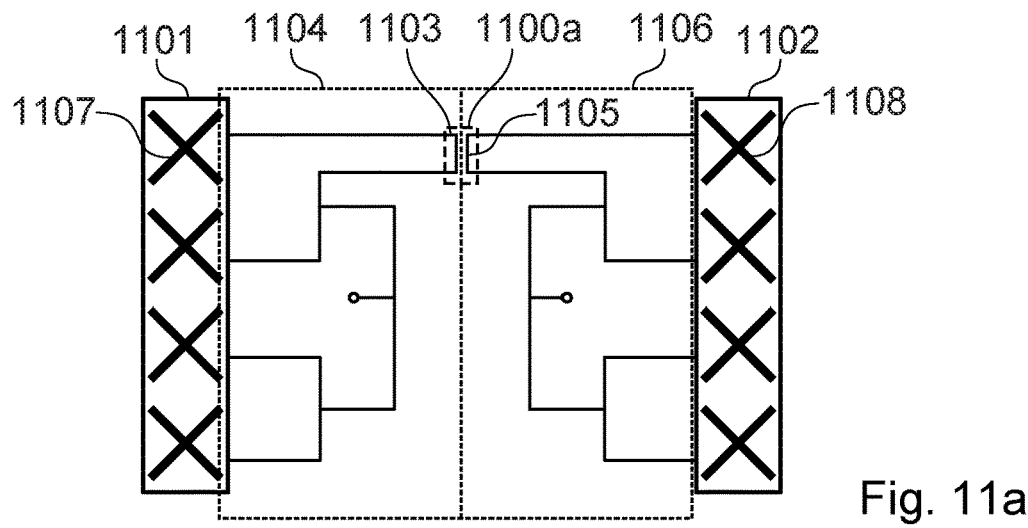
FIGS. 11a, 11b and 11c illustrate examples in which a coupling path 1100a or 1100b is configured to couple the feed networks of two sub-arrays 1101 and 1102.
Figure 11B:
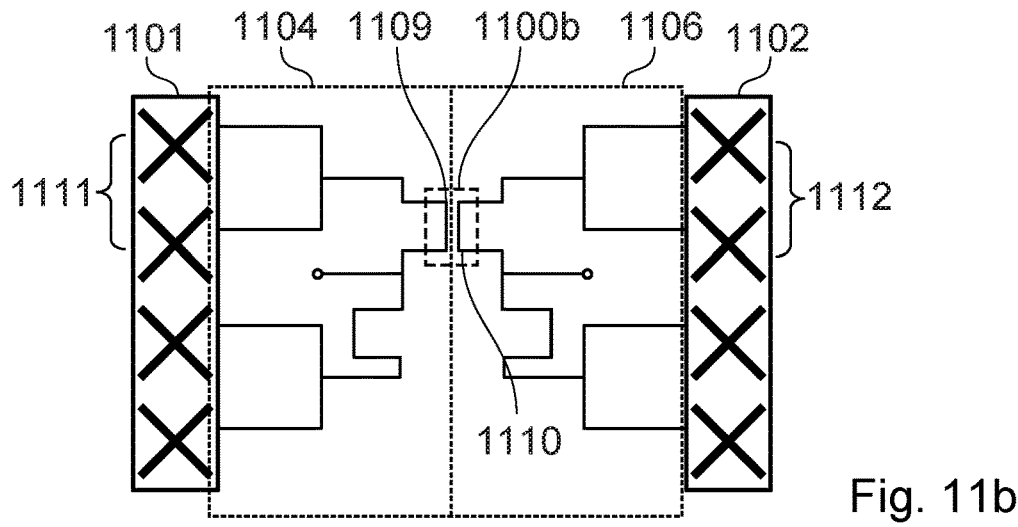
Figure 11C:
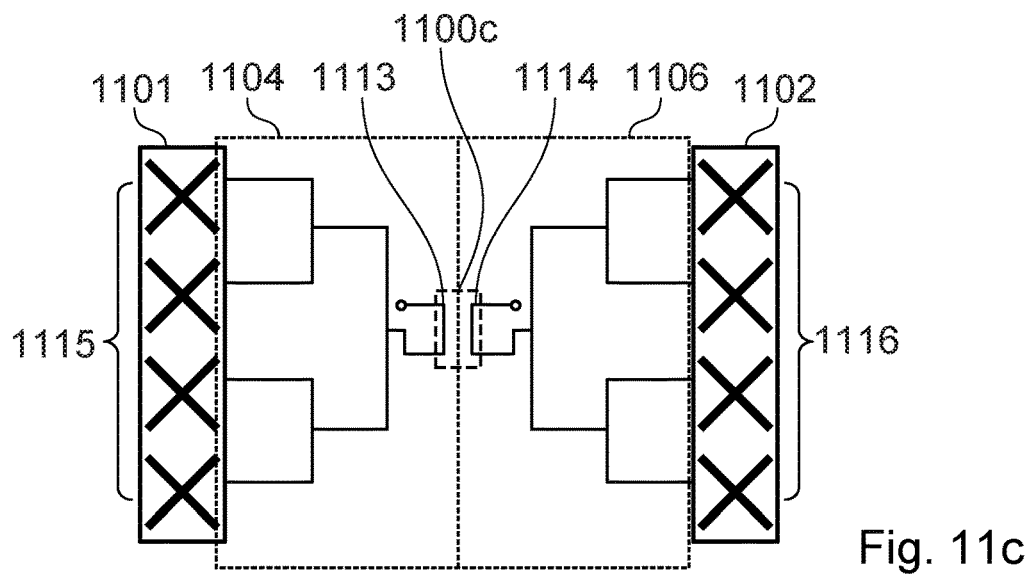

FIGS. 11a, 11b and 11c illustrate an example in which a coupling path 1100a or 1100b is configured to couple the feed networks of two sub-arrays 1101 and 1102. In this example, the sub-array 1101 and 1102 are adjacent to each other in the antenna array in a direction perpendicular to the first direction.

In FIG. 11a, the coupling path 1100a is configured to couple a first section 1103 of a first feed network 1104 to a second section 1105 of a second feed network 1106. The first section 1103 of the first feed network 1104 is coupled to only a first antenna element 1107. The second section 1105 of the second feed network 1106 is coupled to only a second antenna element 1108.

In FIG. 11b, the coupling path 1100b is configured to couple a third section 1109 of the first feed network 1104 to a fourth section 1110 of the second feed network 1106, wherein the third section 1109 of the first feed network 1104 is coupled to a first plurality 1111 of antenna elements and the fourth section 1110 of the second feed network 1106 is coupled to a second plurality 1112 of antenna elements.

In FIG. 11c, the coupling path 1100c is configured to couple a fifth section 1113 of the first feed network 1104 to a sixth section 1114 of the second feed network 1106, wherein the fifth section 1113 of the first feed network 1104 is coupled to a third plurality 1115 of antenna elements and the sixth section 1114 of the second feed network 1106 is coupled to a fourth plurality 1116 of antenna elements.

It will be appreciated that a coupling path between the subarrays may be either between the feed networks having the same polarization or, alternatively, between the feed networks with orthogonal polarizations.

In FIGS. 10a to 11c only one feed network is illustrated for each sub-array, although it will be appreciated that each sub-array may have two feed networks, one for each polarization.

Figure 12A:
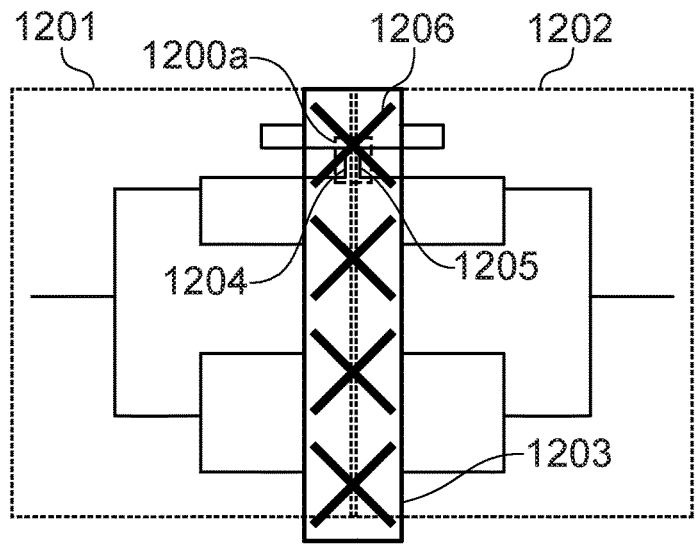
FIGS. 12a to 12c illustrate examples in which a coupling path 1200a, 1200b or 1200c is configured to couple the two feed networks 1201 and 1202 coupled to a single sub-array 1203.
Figure 12B:
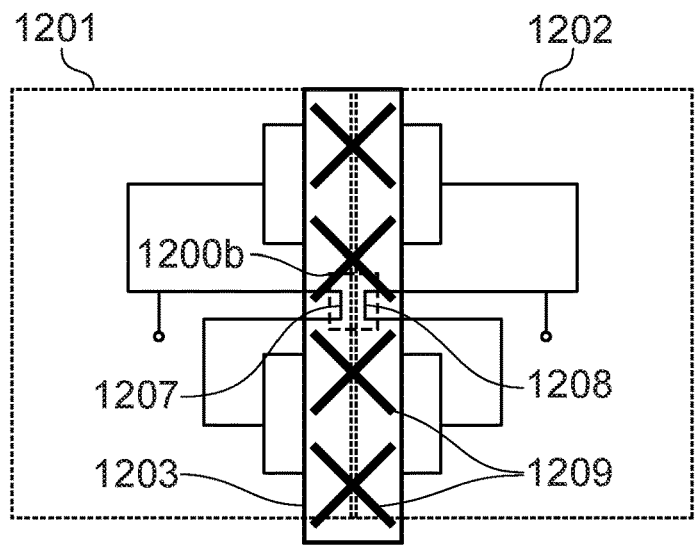
Figure 12C:
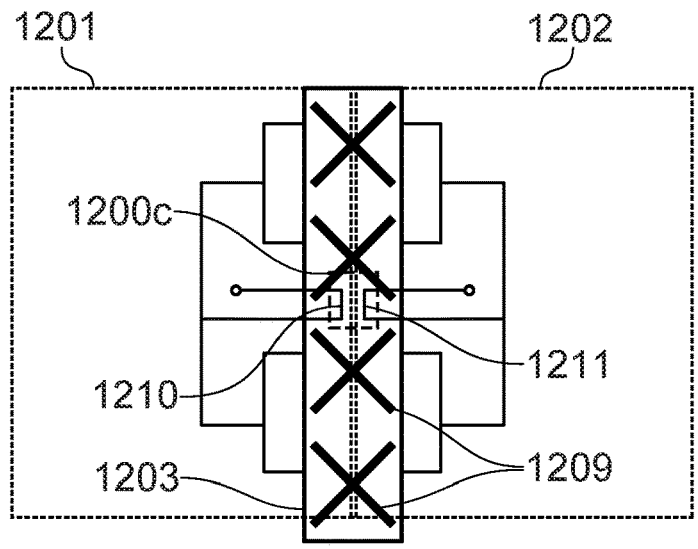

FIGS. 12a to 12c illustrate examples in which a coupling path 1200a, 1200b or 1200c is configured to couple the two feed networks 1201 and 1202 to a single sub-array 1203.

In this example, the coupling path 1200a is configured to couple a first section 1204 of the first feed network 1201 to a second section 1205 of the second feed network 1202. The first section 1204 of the first feed network 1201 is coupled to only a first antenna element 1206. The second section 1205 of the second feed network 1202 is also coupled to only the first antenna element 1206.

In FIG. 12*b*, the coupling path 1200*b* is configured to couple a third section 1207 of the first feed network 1201 to a fourth section 1208 of the second feed network 1202, wherein the third section 1207 of the first feed network 1201 is coupled to a first plurality 1209 of antenna elements and the fourth section 1208 of the second feed network 1202 is also coupled to the first plurality 1209 of antenna elements.

In FIG. 12*c*, the coupling path 1200*c* is configured to couple a fifth section 1210 of the first feed network 1201 to a sixth section 1211 of the second feed network 1202, wherein the fifth section 1210 of the first feed network 1201 is coupled to a second plurality of antenna elements (all antenna elements in the subarray 1203) and the sixth section 1211 of the second feed network 1202 is also coupled to the second plurality of antenna elements The examples of coupling paths illustrated in FIGS. 10*a* to 12*c* may be combined in different ways to give several coupling paths in a single active antenna system to enhance the performance of the calibration procedure.

There are also other alternatives for where to place the directional couplers.

FIGS. 10*a* to 12*c* illustrate examples of where a coupling path may be positioned according to some embodiments. It will also be appreciated that a coupling path may be introduced between subarrays that are not adjacent to each other within the antenna array. The coupling path may also be introduced between sub-arrays which are not positioned either vertically (i.e. along the first direction) or horizontally (e.g. perpendicular to the first direction) with respect to each other.

Figure 13:
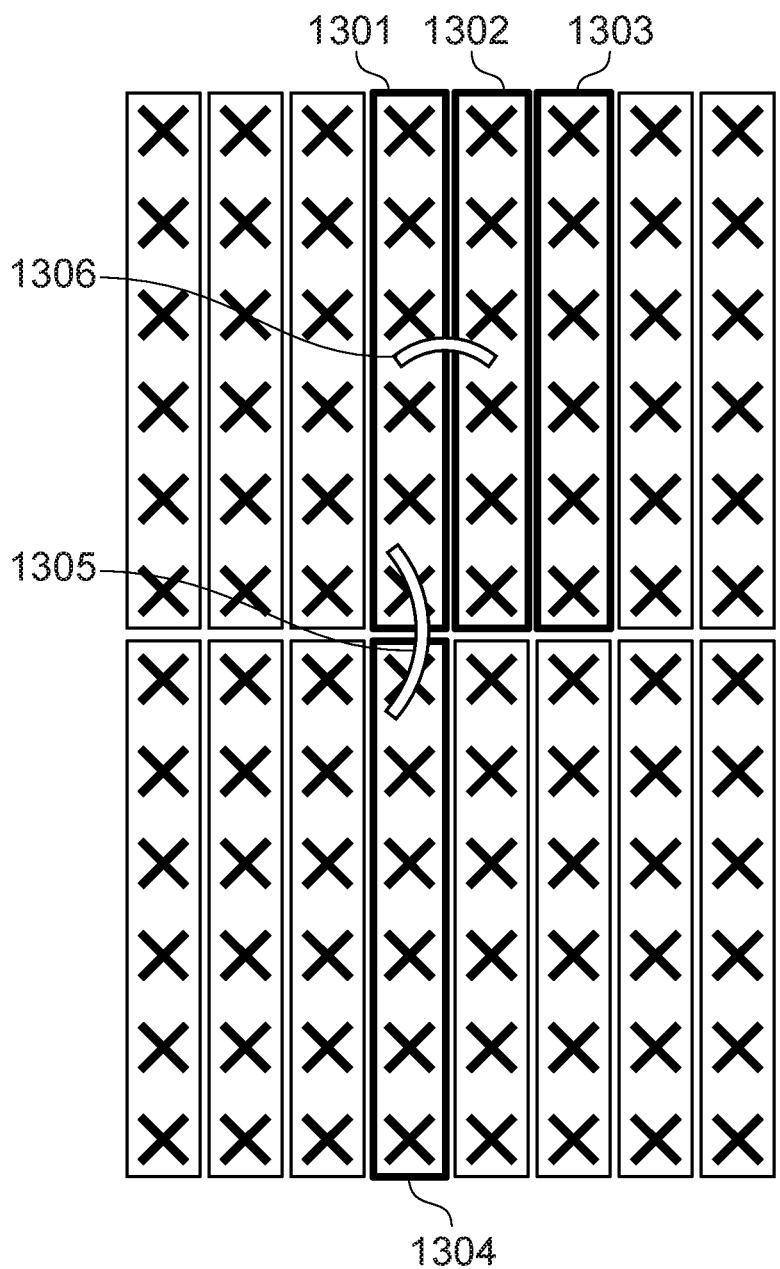
FIG. 13 illustrates an active antenna system comprising 32 radio chains and an antenna array of 6-element vertical sub-arrays with variable electrical tilt in a 2 rows by 8 columns configuration.
Figure 14:
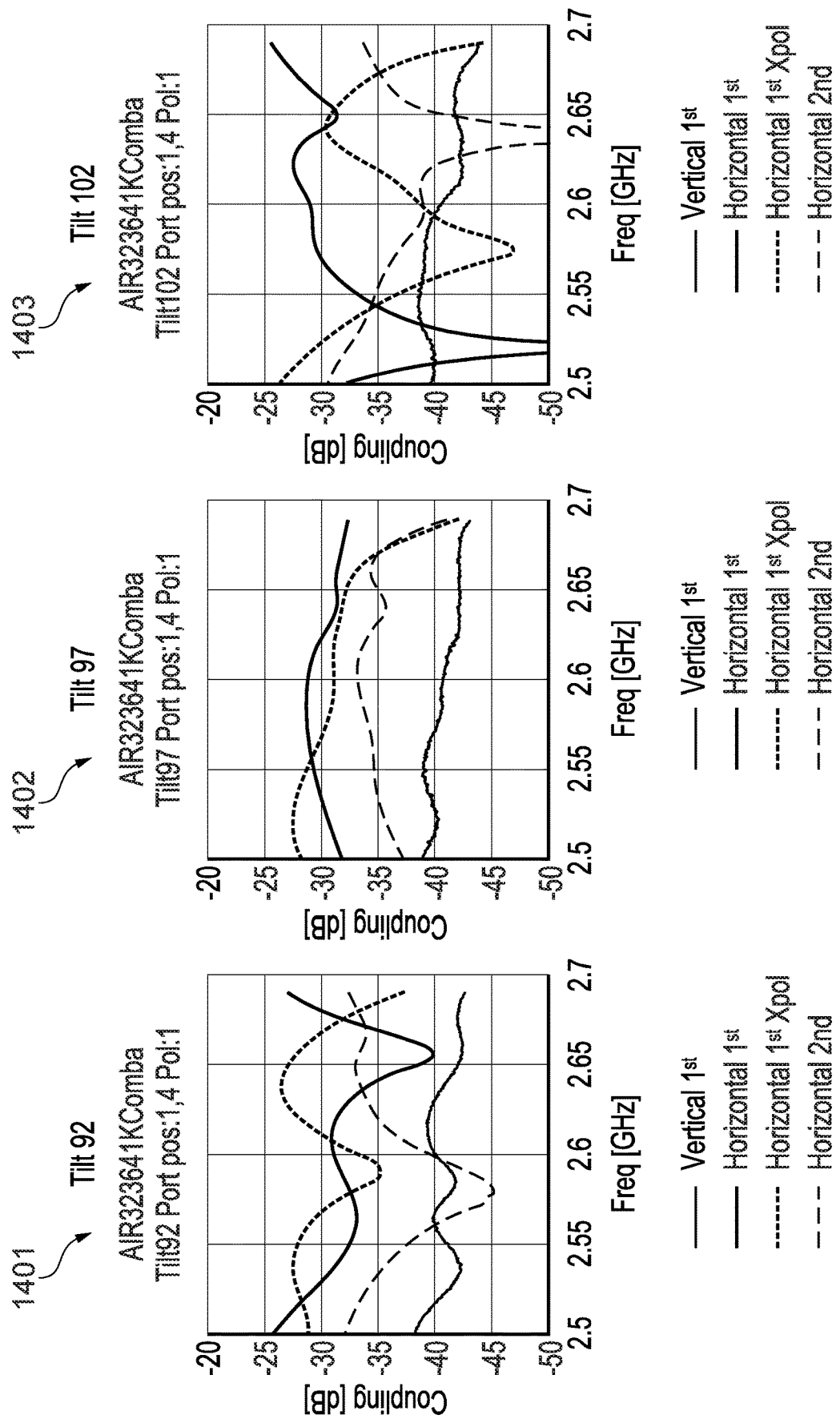
FIG. 14 illustrates the coupling levels associated with each of the sub-arrays 1302 (both co-coupling and cross coupling), 1303 and 1304 when the sub-array 1301 is transmitting at various electrical tilts.
Figure 15:
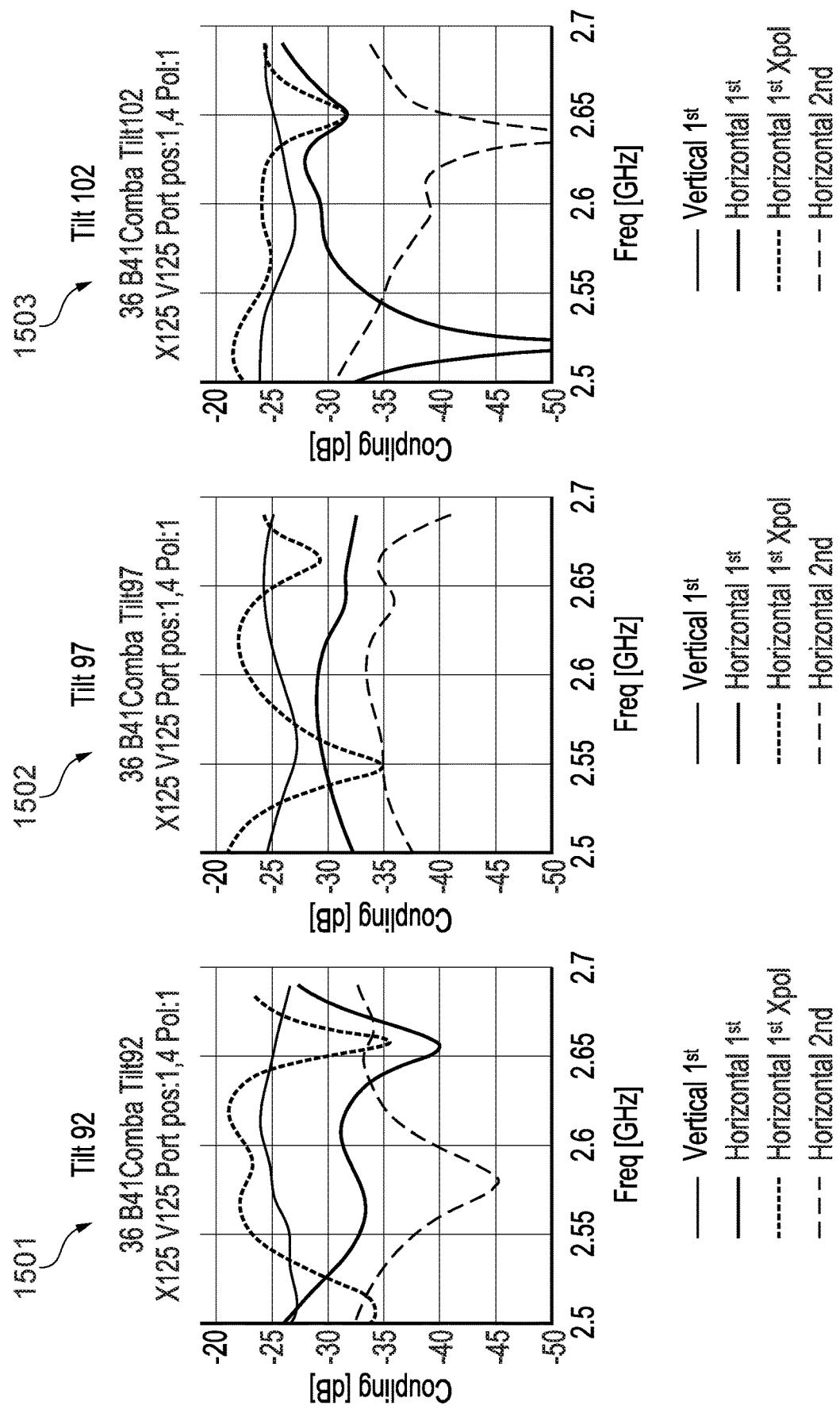
FIG. 15 illustrates the coupling levels resulting from the coupling paths illustrated in FIG. 13 for the same three examples of electrical tilts given in FIG. 14.

FIG. 13 to 15 illustrate an example of how the performance of the calibration procedure can be improved by utilising the embodiments described herein. In this example, the active antenna system comprises 32 radio chains and an antenna array of 6-element vertical sub-arrays with variable electrical tilt in a 2 rows by 8 columns configuration, as illustrated in FIG. 13.

Coupling paths have been provided between the subarrays 1301 and 1302, and 1301 and 1304.

The coupling levels associated with each of the sub-arrays 1302 (both co-coupling and cross coupling), 1303 and 1304 when the sub-array 1301 is transmitting is shown in the graphs of FIG. 14 at various electrical tilts. In particular graph 1401 illustrates the coupling at electrical tilt 92°, the graph 1402 illustrates the coupling at electrical tilt 97°, and the graph 1403 illustrates the coupling at electrical tile 102°.

In this example, the mutual aperture coupling levels are not enough to meet the calibration accuracy requirements when the electrical tilt of the sub-arrays is set to 920 and are marginal for the other two tilt settings. By adding an coupling path 1305 providing coupling having a magnitude of −25 dB for the ports with the same polarization together with an coupling path 1306 providing coupling having a magnitude of −25 dB for the ports with different polarizations, the calibration accuracy can be improved.

FIG. 15 illustrates the coupling levels resulting from the coupling paths illustrated in FIG. 13 for the same three examples of electrical tilts given in FIG. 14. In particular, graph 1501 illustrates the coupling at electrical tilt 92°, the graph 1502 illustrates the coupling at electrical tilt 97°, and the graph 1503 illustrates the coupling at electrical tile 102°. As can be seen, the coupling levels for the cross coupling 1306 with subarray 1302 is improved for all electrical tilts. The co-coupling 1305 with subarray 1304 is also improved for all electrical tilts. The co-coupling with subarray 1302 and the co-coupling with subarray 1303 both remain the same as in FIG. 14 as no coupling paths we provided for these combinations.

Embodiments described herein therefore provide at least one coupling path in an active antenna system that is configured to improve the coupling between sub-arrays such that the performance of a calibration procedure is improved, especially in examples in which the antenna aperture design provides low mutual aperture coupling.

In some embodiments, the at least one coupling path may selectively be added between antenna apertures that experience weak mutual aperture coupling, thus minimizing effects from multiple path couplings.

In some embodiments the at least one coupling path may be designed with directional properties so that harmful cross-coupling to/from antenna apertures may be minimized. By this the impact to beamforming performance can be kept low.

The at least one coupling path may be configured to improve coupling between port pairs that are used in the calibration procedure, and the coupling provided by the at least one coupling path may help the calibration procedure to perform adequately even when the antenna mutual aperture coupling is very weak.

The design of the at least one coupling path may be considered to be relatively independent of the antenna element and array design and may be done without significantly affecting other antenna parameters.

The at least one coupling path design is simple and cost-efficient, because the at least one coupling path may, in some examples, be limited to local subarray neighbors, and may therefore avoid line crossings, thereby avoiding long line routing or multi-layer antenna boards.

The invention claimed is:

1. An active antenna system comprising:
    an antenna array wherein the antenna array comprises a plurality of sub-arrays;
    a plurality of feed networks configured to couple respective signals from the plurality of sub-arrays to respective radio chains; and
    at least one coupling path configured to provide coupling between a first feed network and a second feed network, wherein the first feed network is coupled to a first sub-array and the second feed network is coupled to a second sub-array,
    wherein the coupling is of a higher magnitude than a lowest magnitude of mutual aperture couplings occurring between antenna elements in the first sub-array and the second sub-array.

2. The active antenna system as claimed in claim 1 wherein the coupling is used in a calibration measurement path in a mutual coupling based antenna calibration function to calibrate phase settings and/or amplitude settings of a first radio chain coupled to the first feed network and a second radio chain coupled to the second feed network.

3. The active antenna system as claimed in claim 1, wherein the coupling has a magnitude x, wherein −50 dB≤x≤−15 dB.

4. The active antenna system as claimed in claim 1 wherein the plurality of feed networks comprises two feed networks for each of the plurality of sub-arrays.

5. The active antenna system as claimed in claim 1, wherein a first coupling path of the at least one coupling path is realized by arranging the first feed network and the second feed network to provide a directional coupler between the first feed network and the second feed network.

6. The active antenna system as claimed in claim 1, wherein a second coupling path of the at least one coupling path comprises:
- a first directional coupler coupled to the first feed network;
- a second directional coupler coupled to the second feed network; and
- a signal path between the first directional coupler and the second directional coupler.

7. The active antenna system as claimed in claim 6 wherein the first antenna element and the second antenna element are the same.

8. The active antenna system as claimed in claim 1, wherein a third coupling path of the at least one coupling path comprises a T-split signal path between the first feed network and the second feed network.

9. The active antenna system as claimed in claim 1, wherein the at least one coupling path is configured to couple a first section of the first feed network to a second section of the second feed network, wherein the first section of the first feed network is coupled to only a first antenna element and the second section of the second feed network is coupled to only a second antenna element.

10. The active antenna system as claimed in claim 9 wherein the first plurality of antenna elements and the second plurality of antenna elements are the same.

11. The active antenna system as claimed in claim 1, wherein the at least one coupling path is configured to couple a third section of the first feed network to a fourth section of the second feed network, wherein the third section of the first feed network is coupled to a first plurality of antenna elements and the fourth section of the second feed network is coupled to a second plurality of antenna elements.

12. The active antenna system as claimed in claim 1, wherein the first feed network and second feed network, are coupled to sub-arrays that are positioned next to each other within the antenna array.

13. The active antenna system as claimed in claim 12 wherein the at least one coupling path is configured to couple a first sub-array to a second sub-array adjacent to the first sub-array in the first direction.

14. The active antenna system as claimed in claim 12 wherein the at least one coupling path is configured to couple a first sub-array to a second sub-array adjacent to the first sub-array in a second direction perpendicular to the first direction.

15. The active antenna system as claimed in claim 1, wherein the at least one coupling path is positioned to couple together signals from antenna elements that have mutual aperture coupling that is lower than an expected antenna coupling.

16. The active antenna system as claimed in claim 1, wherein the plurality of sub-arrays are each arranged with a number of antenna elements stacked in a first direction.

17. The active antenna system as claimed in claim 1, wherein the plurality of sub-arrays each comprise four antenna elements.

* * * * *